United States Patent [19]

Olson et al.

[11] 4,441,021

[45] Apr. 3, 1984

[54] LUMINOSITY PROBE FOR DIESEL ENGINE TIMING APPARATUS

[75] Inventors: Gene E. Olson, Kenosha, Wis.; Jerome A. Thompson, Milford, Mich.; Donald D. Grover, Kenosha, Wis.; Christopher B. Stout, Kenosha, Wis.; Thomas P. Becker, Kenosha, Wis.

[73] Assignee: Snap-on Tools Corporation, Kenosha, Wis.

[21] Appl. No.: 285,942

[22] Filed: Jul. 23, 1981

[51] Int. Cl.³ .............................................. G02B 5/14
[52] U.S. Cl. .................................. 250/227; 73/117.3
[58] Field of Search ...................... 73/3 S, 116, 117.3; 250/227, 554; 324/378, 391, 392, 395; 340/578, 579

[56] References Cited

U.S. PATENT DOCUMENTS

| | | | |
|---|---|---|---|
| 3,216,477 | 11/1965 | Devine | 250/554 |
| 4,307,934 | 12/1981 | Palmer | 250/227 |
| 4,337,648 | 7/1982 | Gillespie | 73/117.3 |
| 4,360,729 | 11/1982 | Harvey et al. | 250/227 |
| 4,377,086 | 3/1983 | Linder et al. | 250/227 |

FOREIGN PATENT DOCUMENTS 1425455 2/1976 United Kingdom ................ 250/554

OTHER PUBLICATIONS

"Using Microwaves and Prechamber Luminosity to Set Injection Timing" by Liensch et al., GM Research Labs, Jan. 1980.

Primary Examiner—David C. Nelms
Attorney, Agent, or Firm—Dithmar, Stotland, Stratman & Levy

[57] ABSTRACT

The probe includes a tubular housing having a first portion and a second portion. The first portion is adapted to be mounted in place of the glow plug of a selected engine cylinder. A light pipe within the first portion directs light from the combustion zone to a phototransistor within the second portion. The front of the first portion has a reduced size aperture defined by an internal shoulder against which the front of the light pipe is seated. The rear of the first portion carries resilient sealing means which is deformed when the second portion is telescoped thereon so as to provide a detachable, frictional, light-tight thermally insulated connection therebetween. A phototransistor is mounted within the second portion to convert light passing through the light pipe into electrical signals. A cable carries these electrical signals to processing equipment. A base resistor is located in the second portion between the base of the phototransistor and the cable. The part of the first portion that projects from the engine is short with respect to the part that fits into the engine. The projecting portion carries wrench-engaging bosses.

17 Claims, 8 Drawing Figures

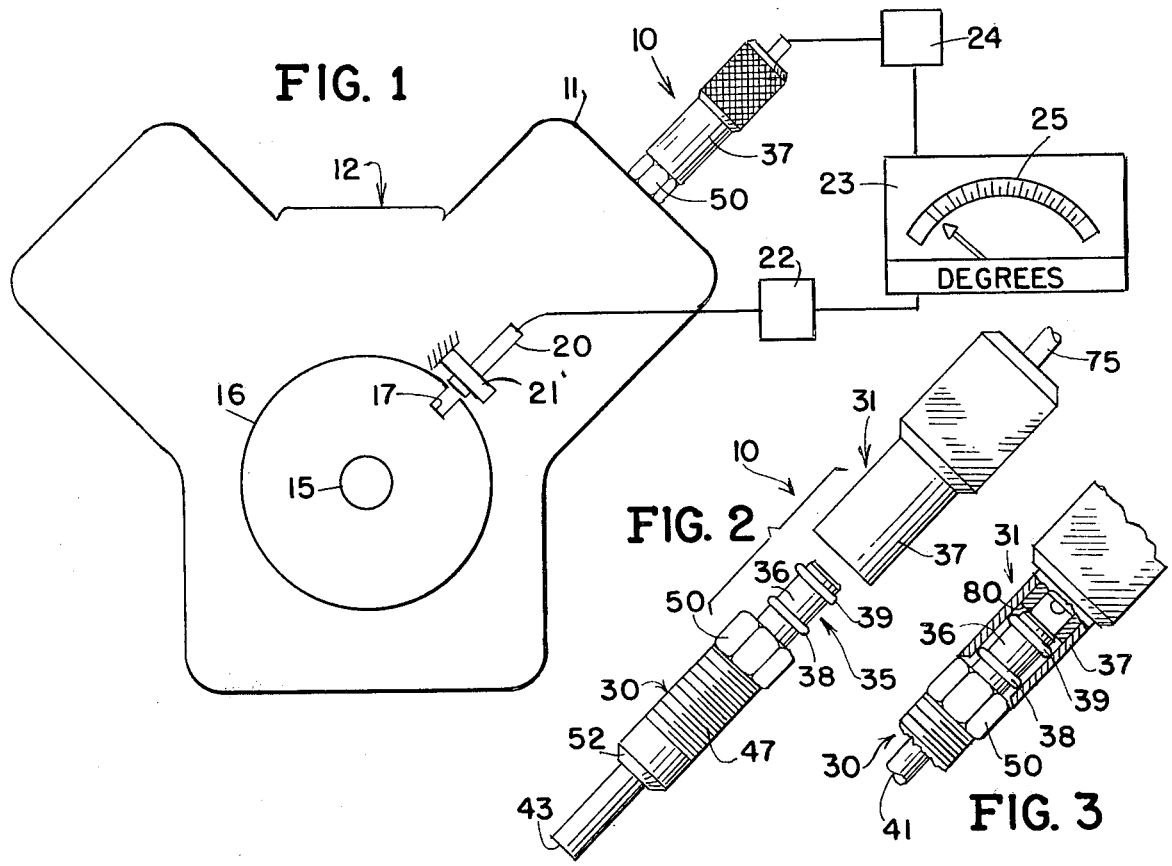
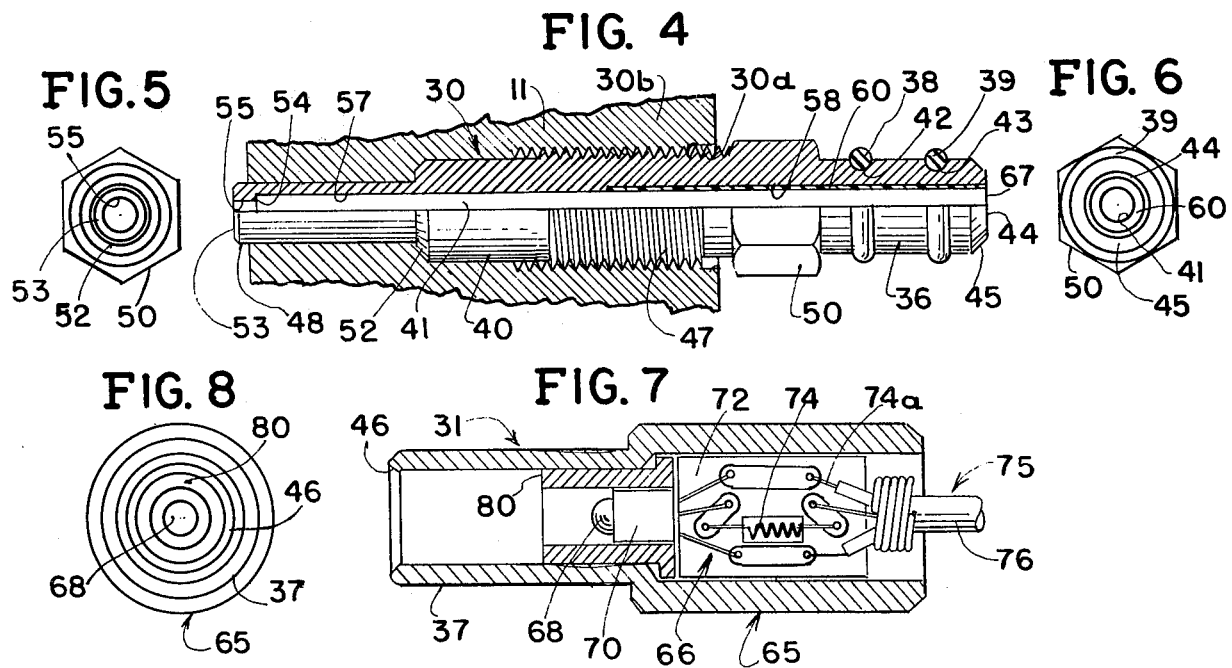

LUMINOSITY PROBE FOR DIESEL ENGINE TIMING APPARATUS

This invention relates to a luminosity probe for diesel engine timing apparatus, and more particularly to a luminosity probe adapted to be mounted in effective relation with the combustion zone of a selected cylinder of a diesel engine. The probe responds to the occurrence of combustion events in the cylinder by converting optical energy signals to electrical energy signals which thereafter are processed in the timing apparatus.

CROSS-REFERENCE TO RELATED APPLICATION

A copending U.S. application owned by the assignee of subject application entitled "Diesel Engine Timing Apparatus," Ser. No. 286,186, filed July 23, 1981, now U.S. Pat. No. 4,373,384 illustrates, describes and claims diesel engine timing apparatus employing the luminosity probe of this application. Reference is made to the copending application for a more detailed description of the relation between the present luminosity probe and the overall diesel engine timing apparatus.

SUMMARY OF THE INVENTION

One object of the invention is to provide a luminosity probe for diesel engine timing apparatus adapted to be mounted in an opening, for example the glow plug opening, of a selected diesel engine cylinder, the probe in one embodiment comprising two separable parts, enabling a first part including a light pipe to be installed initially in the opening, and a second part including a phototransistor readily to be connected later to the first part. This feature simplifies installation of the probe, avoids replacement of both parts in case only one part is damaged and minimizes the required length of light pipe (due to proximity of the phototransistor), thereby reducing attenuation of optical signals in the light pipe and light pipe cost.

Another object is to provide a luminosity probe of the above character wherein the first part contains a light pipe and the second part contains an optical detector in effective relation with the light pipe, the optical detector including photoelectric means for converting optical energy signals in the light pipe derived from combustion within the cylinder to electrical energy signals usable in diesel engine timing apparatus.

Another object is to provide such a luminosity probe wherein the aforesaid two probe parts are connectable in simple push on, pull off manner.

Another object of the invention is to provide an effective luminosity probe which is of rugged construction, is able to withstand the high combustion temperatures encountered in use and is relatively economical and uncomplicated to manufacture.

A luminosity probe in accordance with one embodiment of this invention comprises a tubular body member adapted to be mounted in an opening into the combustion zone of a selected diesel engine cylinder, a light pipe within and extending substantially the length of the body member, a detector housing, means for establishing a detachable connection between the body member and detector housing, an optical detector within the detector housing in effective relation with the light pipe, the optical detector including means for converting optical energy signals in the light pipe derived from combustion within the cylinder to electrical energy signals and an output means for the electrical signals.

The means for establishing a detachable connection between the body member and the detector housing comprises resilient sealing material between telescoping end lengths of the body member and detector housing, the resilient sealing material establishing a detachable, frictional, light-tight and thermally insulated connection between the body member and the detector housing, whereby the body member and the detector housing relate in push on, pull off manner and the optical detector is insulated from combustion heat. Also, metal-to-metal contact is avoided, further reducing heat transfer.

In more detailed aspect, the resilient sealing material of the connecting means comprises a pair of axially spaced O-rings disposed in annular recesses in one of the telescoping end lengths. Further, the connecting end of the body member is provided with a chamfer to facilitate insertion thereof into the connecting end length of the detector housing.

In further detail, the tubular body member has external threads for engaging threads within the opening into the combustion zone, the shape and size of the portion of the body member that projects into the combustion zone being substantially the same as the shape and size of the glow plug portion that projects into the zone. In practice a foreshortening of this portion is advantageous from the standpoints of avoiding fuel spray and reducing heat to the probe, thereby enhancing probe life, while increasing the portion of the cylinder (or prechamber) interior subject to view for gathering light. Also, the tubular body member has external wrench-engaging bosses to facilitate mounting the member in the glow plug opening.

Other important features of the invention involve the sizes and lengths of the respective portions of the tubular opening in the body member, the relationship between the tubular opening portions and the light pipe and the use of high temperature adhesive means to secure the light pipe properly within the body member. The relationships are such that the adhesive means, for example epoxy, is well isolated and insulated from the high temperature combustion gases which otherwise would damage the adhesive means.

The optical detector within the detector housing includes an optical lens in effective relation with the light pipe in the body member, a phototransistor in effective relation with the lens and an electrical circuit including the phototransistor and a base resistor, whereby combustion-indicating luminosity in the light pipe is focused on the phototransistor, and the effect of lead capacitance between the phototransistor base and electrical ground is minimized. Also, a voltage source desirably is included to provide electrical amplification.

Other objects, advantages and details of the invention will be apparent as the description proceeds, reference being had to the accompanying drawings wherein one form of the invention is shown. It will be understood, however, that the description and drawings are illustrative only, and that the scope of the invention is to be measured by the appended claims.

BRIEF DESCRIPTION OF THE DRAWINGS

FIG. 1 is a diagrammatic representation of a diesel engine wherein a luminosity probe of the invention is shown applied to a selected cylinder thereof; other general features of the overall diesel timing apparatus also are shown;

FIG. 2 is a side elevational view of a luminosity probe of the invention, the two parts of the probe being shown in separated relation;

FIG. 3 is a fragmentary side elevational view, partly in section, showing the two parts of the probe in connected relation;

FIG. 4 is a longitudinal view, partly in elevation and partly in section of a part of the probe shown mounted in a fragmentary cylinder portion of a diesel engine;

FIG. 5 is an end view of one end of FIG. 4;

FIG. 6 is an end view of one end of FIG. 4;

FIG. 7 is a longitudinal sectional view of another part of the probe, namely, the part containing the optical detector; and FIG. 8 is an end view of the adjacent end of FIG. 7.

DETAILED DESCRIPTION

Referring to FIG. 1 of the drawings, diesel timing apparatus using the luminosity probe of the invention first will be described briefly.

A luminosity probe 10 embodying the invention is shown applied to a selected cylinder 11 of the diagrammatically illustrated diesel engine 12. Crank shaft 15 of engine 12, or a shaft driven by the crank shaft, carries a rotating engine part 16, such as a harmonic balancer, the latter having a peripherial notch 17 or other marker means such as a projection or embedded magnet.

A sensing device 20, such as a magnetic sensing device, is mounted detachably in a fixed receptacle 21 such that sensing device 20 is in effective relation with rotating engine part 16 and the peripheral notch 17 therein. Receptacle 21 is so located with respect to the engine block that notch 17 passes sensing device 20 a known number of degrees of engine and crank shaft rotation after the piston in the number one cylinder has reached its top-dead-center position. Sensing device 20 generates an electrical signal each time notch 17 passes, this series of electrical signals is fed through processing circuitry 22 to a meter 23.

As will be seen, luminosity probe 10 of the invention responds to optical energy signals derived from successive combustion events within cylinder 11, and provides electrical energy signals fed through processing circuitry 24 to the aforesaid meter 23. Dial 25 of meter 23 with the aid of circuitry 22 and 24 is calibrated to read the number of engine degrees between the top-dead-center event indicated by notch 17 and the combustion event in selected cylinder 11. In timing a diesel engine, the serviceman adjusts the fuel injector and thus combustion event in order that the degrees displayed on meter 23 match the degrees specified by the engine manufacturer for a particular engine speed.

As previously mentioned, further details of the overall timing apparatus are set forth in the aforesaid co-pending U.S. patent application.

Referring next to FIG. 2, the illustrated luminosity probe 10 embodying the invention includes a first part 30 and a second part 31. The two probe parts are shown separated in FIG. 2, and, as will be seen, they are connectable as shown in FIG. 3 by simple "push on" action. Conversely, they are readily separable by equally simple "pull off" action.

Means, generally designated 35 in FIG. 2, for establishing the push on, pull off detachable connection between first probe part 30 and second probe part 31, as shown, comprise end length 36 on first part 30 and cooperating end length 37 on second part 31, the end length 36 telescoping into end length 37. Resilient sealing material, such as axially spaced O-rings 38 and 39, are disposed between the telescoping end lengths in order to establish a detachable, frictional, light-tight and thermally insulated connection between the two probe parts 30 and 31.

Referring to FIG. 4, first probe part 30 comprises a tubular body member 40 adapted to be mounted in an opening 30a in wall 30b of selected engine cylinder 11. A light pipe 41 such as a fused silica rod is secured within the central opening of body member 40, and extends substantially from end to end of the body member. As shown in FIG. 4, previously mentioned O-rings 38 and 39 are received in cooperating annular recesses 42 and 43 in end length 36 of body members 40.

Still referring to FIG. 4 and also referring to FIG. 6, free end 44 of end length 36 of first probe part 30 is provided with a chamfer 45 to facilitate insertion of the end into connecting end length 37 of second probe part 31. As shown in FIG. 7, the mouth of end length 37 has a cooperating chamfer 46 that further facilitates insertion.

Tubular body member 40 of first probe part 30 has external threads 47 intermediate the ends thereof for engaging threads within opening 30a. When opening 30a is an existing glow plug opening, the shape and size of the portion of first probe part 30 projecting into the combustion zone has substantially the same shape and size as the portion of the replaced glow plug which projects into the zone. In practice, a foreshortening of probe tip 48 is advantageous from the standpoints of avoiding fuel spray, reducing combustion heat at the tip, thus enhancing probe life, while increasing the portion of the combustion zone subject to view, providing more light to light pipe 41.

External wrench-engaging bosses 50 are provided on body member 40 to facilitate installing the body member in the opening 30a.

Referring further to FIG. 4 and referring to FIG. 5, body member 40 has an external annular shoulder 52 facing and spaced from the end 53 of the body member that enters cylinder 11, the shoulder 52 being adapted to seat on a cooperating shoulder in opening 30a to position body member 40 properly in the opening.

Referring to the left-hand end of FIG. 4, tubular body member 40 has an internal shoulder 54 spaced from and facing away from the end 53 of the body member that enters cylinder 11. This internal shoulder 54 serves as a seat for the adjacent end of light pipe 41, whereby in the event of light pipe breakage, pieces thereof are prevented from falling into the cylinder. Also, the central opening 55 between internal shoulder 54 and adjacent end 53 of body member 40 provides a dead air space 55 which isolates the end of light pipe 41 from direct contact with combustion flame, thereby minimizing carbon buildup.

The central opening through tubular body member 40 between internal shoulder 54 and the opposite end 44 of the body member has a first length 57 of substantially the same diameter as light pipe 41, the remaining length 58 to the end being of larger diameter.

The larger diameter opening length 58 provides an annular space around the corresponding length of light pipe 41 which receives high temperature adhesive means 60 to secure light pipe 41 properly within body member 40. It will be understood that internal shoulder 54, the dead air space 55 and the snug fit of light pipe 41 within first length 57 cooperate to isolate and insulate adhesive means 60 from combustion gases which otherwise tend to damage the adhesive means which, for example, is a high temperature epoxy material, or the like.

Referring to FIGS. 7 and 8, the illustrated second part 31 of the luminosity probe of the invention comprises a tubular detector housing 65. An optical detector, generally designated 66, is contained within detector housing 65 in effective relation with the adjacent end 67 (FIG. 4) of light pipe 41. Optical detector 66 includes means for converting optical energy signals in light pipe 41 derived from combustion within the cylinder to electrical energy signals.

Detector 66 includes an optical lens 68, a phototransistor (PT) 70 in effective relation with lens 68 and an electrical circuit 72 including phototransistor 70, a base resistor 74 and a voltage source such as conductor 74a. As shown, electrical circuit 72 for the most part may be an economical printed circuit which desirably is potted in material such as epoxy.

The electrical energy signals generated in the optical detector 66 are applied to an output means 75 shown as cable 76. Voltage source conductor 74a also is part of cable 76.

Still referring to FIG. 7, when first part 30 of probe 10 is connected to second part 31, end 44 of first part 30 (FIG. 4) abuts an internal shoulder 80 within the connecting end length 37 of second part 31. It will be noted that optical lens 68 is recessed behind shoulder 80 so as to avoid damaging engagement between lens 68 and the adjacent end 67 of light pipe 41.

From the above description it is believed that the construction and advantages of the luminosity probe of the invention will be readily apparent to those skilled in the art. Various changes in detail may be made without departing from the spirit or losing the advantages of the invention.

Having thus described the invention, what is claimed as new and desired to secure by Letters Patent is:

1. A luminosity probe for diesel engine timing apparatus, comprising a tubular body member having an inserting portion adapted to be mounted in an opening into the combustion zone of a selected engine cylinder, one end of said body member being exposed to light in the combustion zone, said tubular body member having a projecting portion projecting beyond the cylinder exterior, a light pipe within said body member, resilient sealing material on said projecting portion, a tubular detector housing telescopically receiving said projecting portion and being constructed to deform said resilient sealing material, whereby said resilient sealing material establishes a detachable, frictional, light-tight and thermally insulated connection between said body member and said detector housing, and whereby said body member and said detector housing relate in push on, pull off manner and said optical detector is insulated from combustion heat, an optical detector within said detector housing in effective relation with the adjacent end of said light pipe, said optical detector including means for converting optical energy signals in said light pipe derived from combustion within the cylinder to electrical energy signals, and output means for the electrical energy signals.

2. The luminosity probe of claim 1, wherein both said inserting portion and said projecting portion are round in transverse cross section.

3. The luminosity probe of claim 1 wherein said resilient sealing material comprises a pair of axially spaced O-rings disposed in annular recesses in said projecting portion.

4. The luminosity probe of claim 1 wherein said end projecting portion is provided with a chamfer to facilitate insertion into said detector housing.

5. The luminosity probe of claim 1 wherein said tubular body member has external threads on said inserting portion for engaging threads within the cylinder opening, and external wrench-engaging bosses on said body member between said inserting and projecting portions to facilitate mounting said body member in the opening.

6. The luminosity probe of claim 1 wherein said tubular body member has an external shoulder facing and spaced from the end of said body member entering the glow plug opening, said shoulder adapted to seat on a cooperating shoulder in the opening to position said body member properly in the opening.

7. The luminosity probe of claim 1 wherein said tubular body member has an internal shoulder facing away from the end of said body member entering the opening, said internal shoulder being spaced a relatively short distance from the end of said body member entering the opening compared to the length of the portion of said body member entering the opening, said internal shoulder serving as a seat for the adjacent end of said light pipe, whereby in the event of light pipe breakage, pieces thereof are prevented from falling into the cylinder, and the opening between said internal shoulder and the adjacent end of said body member provides a dead air space which isolates the end of said light pipe from contact with combustion flame, thereby minimizing carbon build up.

8. The luminosity probe of claim 7 wherein the housing opening through said tubular body member between said internal shoulder and said other end of said body member has a first length of substantially the same diameter as said light pipe and a remaining length of larger diameter, thereby to provide a snug fit between said light pipe and said first length, and with the addition of high temperature adhesive means in said larger diameter length to secure said light pipe properly within said body member, the engagement between said internal shoulder and the adjacent end of said light pipe and the snug fit of said light pipe within said housing opening cooperate to isolate said adhesive means from combustion gases.

9. The luminosity probe of claim 1 wherein said optical detector within said detector housing includes an optical lens in effective relation with the adjacent end of said light pipe, a phototransistor in effective relation with said lens and an electrical circuit including said phototransistor and a base resistor, whereby combustion-indicating luminosity in said light pipe is focused on said phototransistor and the effect of lead capacitance between the phototransistor base and ground is minimized.

10. A luminosity probe for diesel engine timing apparatus, comprising a first telescoping element defined by a tubular body member having an inserting portion adapted to be mounted in an opening into the combustion zone of a selected cylinder, one end of said body member being exposed to light in the combustion zone, said tubular body member having a projecting portion projecting beyond the cylinder exterior, a light pipe within said body member, a second telescoping element defined by a tubular detector telescopically engaging with said first telescoping element, resilient sealing material on one of said telescoping elements and being constructed to become deformed when said telescoping elements are engaged, whereby said resilient sealing material establishes a detachable, frictional, light-tight and thermally insulated connection between said body member and said detector housing, and whereby said body member and said detector housing relate in push on, pull off manner and said optical detector is insulated from combustion heat, an optical detector within said detector housing in effective relation with the adjacent end of said light pipe, said optical detector including means for converting optical energy signals in said light pipe derived from combustion within the cylinder to electrical energy signals, and output means for the electrical energy signals.

11. The luminosity probe of claim 10, wherein said light pipe extends substantially the length of said body member.

12. A luminosity probe for diesel engine timing apparatus, comprising a tubular housing means having a first portion and a second portion, said first portion adapted to be mounted in an opening into the combustion zone of a selected engine cylinder and to be exposed to light in the combustion zone, said first portion having a housing opening therethrough; a light pipe residing in said housing opening and being of one-piece construction and having a diameter substantially matching the diameter of said housing opening; an internal shoulder facing away from the end of said first portion entering said opening, said internal shoulder being spaced a relatively short distance from the end of said body member entering the cylinder opening compared to the length of said inserting portion, said internal shoulder serving as a seat for the adjacent end of said light pipe; an optical detector within said second portion, said optical detector including means for converting optical energy signals in said light pipe derived from combustion within the cylinder to electrical energy signals; and output means for the electrical energy signals; whereby in the event of light pipe breakage, pieces thereof are prevented from falling into the cylinder, and the housing opening between said internal shoulder and the adjacent end of said first portion provides a dead air space which isolates the end of said light pipe from contact with combustion flame, thereby minimizing carbon build up.

13. The luminosity probe of claim 12 wherein the housing opening in said first portion of said tubular housing means between said internal shoulder and the other end of said first portion has a first length of substantially the same diameter as said light pipe and a remaining length of larger diameter, thereby to provide a snug fit between said light pipe and said first length, and with the addition of high temperature adhesive means in said larger diameter length to secure said light pipe properly in said first portion, the engagement between said internal shoulder and the adjacent end of said light pipe and the snug fit of said light pipe within said housing opening cooperate to isolate said adhesive means from combustion gases.

14. The luminosity probe of claim 12 wherein said means for converting optical energy signals in said light pipe includes a phototransistor, a base resistor, a voltage source and circuitry providing amplification of the electrical signals generated by said phototransistor.

15. The luminosity probe of claim 12, wherein said light pipe extends substantially the length of said body member.

16. The probe of claim 12, wherein said internal shoulder is substantially normal to the axis of said first portion.

17. The probe of claim 12, wherein said internal shoulder extends completely around said housing opening.

* * * * *

UNITED STATES PATENT AND TRADEMARK OFFICE
CERTIFICATE OF CORRECTION

PATENT NO. : 4,441,021
DATED : April 3, 1984
INVENTOR(S) : Gene E. Olson et al.

It is certified that error appears in the above-identified patent and that said Letters Patent are hereby corrected as shown below:

Claim 4, line 5, after "said" delete "end" therefor.

Signed and Sealed this

Fifth Day of June 1984

[SEAL]

Attest:

GERALD J. MOSSINGHOFF

Attesting Officer

Commissioner of Patents and Trademarks